M. RATIGNIER & H. PERVILHAC.
PROCESS FOR THE CONTINUOUS MANUFACTURE OF PELLICLES.
APPLICATION FILED DEC. 30, 1908.
947,457.
Patented Jan. 25, 1910.
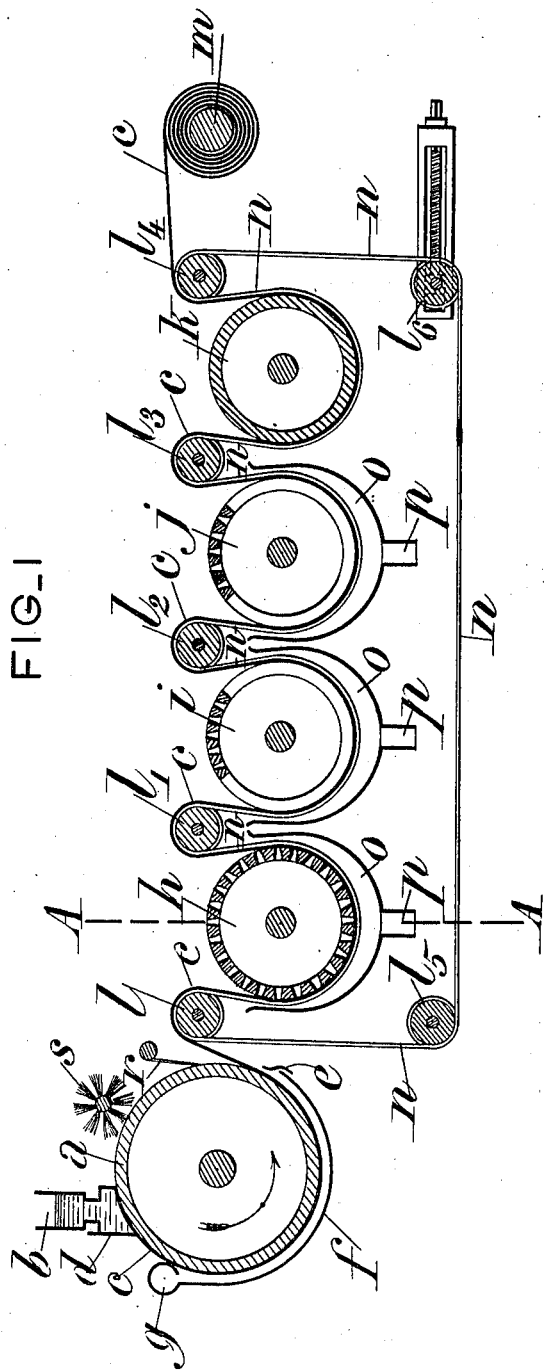
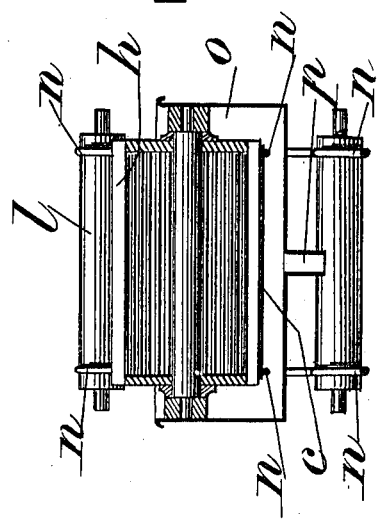
WITNESSES
INVENTORS
Marius Ratignier
Henry Pervilhac
BY
ATTY.

UNITED STATES PATENT OFFICE.

MARIUS RATIGNIER AND HENRY PERVILHAC, OF LYON, FRANCE.

PROCESS FOR THE CONTINUOUS MANUFACTURE OF PELLICLES.

947,457.     Specification of Letters Patent.     Patented Jan. 25, 1910.

Application filed December 30, 1908. Serial No. 469,941.

*To all whom it may concern:*

Be it known that we, MARIUS RATIGNIER and HENRY PERVILHAC, citizens of the French Republic, and residing at Lyon, in France, have invented a certain new and useful Process for the Continuous Manufacture of Pellicles, of which the following is a specification.

In the process which forms the object of the present invention, the different compounds, which serve at present for producing artificial silk, are used for the continuous manufacture of pellicles. The process is particularly characterized by maintaining the pellicle in stretched condition during the course of its manufacture. The more or less regular withdrawal of the compound is thus avoided, and a perfectly plane pellicle is obtained, possessing a brilliance and transparency not produced hitherto by known processes.

The accompanying drawing shows apparatus suitable for carrying out the process.

Figure 1 is a diagram representing the entire apparatus. Fig. 2 is a section on the line A—A of Fig. 1.

The molding of the pellicle is effected on a cylinder $a$ consisting of a hard substance and perfectly polished, said cylinder being adapted to rotate slowly in the direction of the arrow. For this purpose the compound is contained in a liquid state in a reservoir $b$, placed above the cylinder, and flows over the surface of the latter in a regular sheet, the thickness and width of which are limited by the movable wall $d$ of the reservoir $b$ said wall leaving between itself and the cylinder an opening of regulatable dimensions. The pressure of flow is further regulated by maintaining a constant level in the reservoir $b$. Immediately after its formation the pellicle $c$ passes into a strainer $f$ inclosing the whole lower part of the cylinder and in which circulates a hardening or solidifying liquid, the nature of which is appropriate to the compound used. This liquid passes to the upper part of the strainer by means of a pipe $g$, and flows to the lower part thereof raising a flap $e$ of caoutchouc, which bears against the pellicle. The latter is therefore constantly soaked in the renewed liquid and passes out of the strainer $f$ in a perfectly solidified condition. The pellicle is detached by a scraper $r$, which also acts to clean the cylinder, this cleaning being completed by a rotary brush $s$, which is also adapted to deposit on the cylinder a greasy or other substance for preventing the adherence of the pellicle to the cylinder.

On leaving the cylinder $a$, the pellicle passes successively around the cylinders $h, i, j$ and $k$ being accompanied during the whole course by two endless parallel cords $n$, $n$ (Fig. 2) which exert pressure against the cylinders. For this purpose, the cords $n$, $n$ are guided by rollers $l$, $l_1$, $l_2$, $l_3$, $l_4$, $l_5$, $l_6$, the separation or distance being maintained by grooves formed in said rollers, and their tension is obtained by the displacement of one of the lower rollers $l_6$. The cords could however be replaced by bands, threads or ribbons of flexible and inextensible construction. The pellicle $c$ passes firstly over the roller $l$, above the cords $n$, then between the cords and the cylinder $h$, passes upward again over the second roller $l_1$, after which it passes around the second cylinder $i$, and so on up to the cylinder $k$, where it issues in finished condition and is wound on the roller $m$. The first cylinder $h$ serves for washing off the solidifying substance remaining on the pellicle, its surface being perforated or formed of plates to afford a clear passage to the water, which is fed freely to the interior and passes into a trough $o$ whence it escapes by a drain $p$. The pellicle, thus washed on its surfaces, passes to the cylinder $i$, similarly constructed to the cylinder $h$, and where it is submitted to the action of acids or other reagents already known for producing films. The pellicle passes from here on the cylinder $j$, which is similar to cylinder $h$, where it is submitted to a second washing with water and finally it passes onto the drying cylinder $k$, heated by known means at a regular temperature, whereupon it is wound on the roller $m$.

If necessary the drying in a tensioned state may be continued on this latter roller, by interposing a cloth (linen) between each convolution of the pellicle during the winding.

What we claim as our invention and desire to secure by Letters Patent of the United States is:—

1. A process for the manufacture of pellicles, consisting in first forming a compound into a sheet and then treating the said sheet with acid and washing the same while stretching the sheet transversely.

2. A process for the continued manufacture of pellicles, consisting in forming a compound into a sheet, treating said sheet with a solidifying agent, then stretching the same transversely and treating it while so stretched with acid and washing the sheet.

In witness whereof we have signed this specification in the presence of two witnesses.

MARIUS RATIGNIER.
HENRY PERVILHAC.

Witnesses:
GASTON JEANNIAUX,
THOS. N. BROWN.